United States Patent [19]

Nakamura

[11] Patent Number: 5,139,156

[45] Date of Patent: Aug. 18, 1992

[54] VARIABLE SPEED ELECTRIC HOIST

[75] Inventor: Youji Nakamura, Fukuoka, Japan

[73] Assignee: Mitsubishi Denki K.K., Tokyo, Japan

[21] Appl. No.: 687,081

[22] Filed: Apr. 18, 1991

Related U.S. Application Data

[63] Continuation of Ser. No. 372,420, Jun. 28, 1989, abandoned.

[30] Foreign Application Priority Data

Dec. 28, 1988 [JP] Japan .................. 63-332235

[51] Int. Cl.⁵ .............................. B66C 13/18
[52] U.S. Cl. .................... 212/149; 254/362; 318/261
[58] Field of Search ............. 361/23; 318/727, 739, 318/741, 744, 759, 261; 254/267, 274–275, 362; 212/149; 187/108, 109, 105, 133

[56] References Cited

U.S. PATENT DOCUMENTS

| 4,175,727 | 11/1977 | Clarke | 254/274 |
| 4,359,208 | 11/1982 | Kelm et al. | 254/362 |
| 4,437,133 | 3/1984 | Rueckert . | |
| 4,519,479 | 5/1985 | Tanahashi | 187/105 |
| 4,548,299 | 10/1985 | Nomura | 318/741 |
| 4,636,962 | 1/1987 | Broyden et al. | 254/362 |
| 4,789,135 | 12/1988 | Watanabe | 254/362 |

FOREIGN PATENT DOCUMENTS

58-183594 10/1983 Japan .
61-101397 5/1986 Japan .

*Primary Examiner*—Jesus D. Sotelo
*Attorney, Agent, or Firm*—Sughrue, Mion, Zinn Macpeak & Seas

[57] ABSTRACT

A variable speed electric hoist includes an invertor unit for frequency-controlling the speed of rotation of a lifting motor, a brake on/off section for turning off a brake according to a command produced from the invertor unit while the invertor unit is supplying a three-phase AC current to the lifting motor. The electric hoist also includes an emergency brake turn-on section for detecting a condition that a command produced from the invertor unit is not stopped after a lifting/lowering command is stopped to thereby turn on the brake upon detection of the condition.

6 Claims, 2 Drawing Sheets

VARIABLE SPEED ELECTRIC HOIST

This is a continuation of application Ser. No. 07/372,420 filed June, 28, 1989, now abandoned.

BACKGROUND OF THE INVENTION

1. FIELD OF THE INVENTION

The present invention relates to an improvement in a variable speed electric hoist having an invertor unit as a variable speed controller for a lifting motor.

2. DESCRIPTION OF THE PRIOR ART

As an example of the variable speed electric hoist of the kind as described above, conventionally, there has been proposed an electric hoist such as disclosed in Japanese Patent Unexamined Publication No. 58-183594. In this variable speed hoist, the output frequency of an invertor unit is increased/decreased by a speed setter. If the output frequency is selected to be extremely low in setting the speed of a lifting motor, it is possible that a hung load will fall down during the lifting operation, because the lifting motor is a basket-type induction motor and its torque becomes extremely low particularly when run at a low speed.

Further, the speed of rotation of the lifting motor becomes lower than its synchronous speed by a value corresponding to a slip in a lifting operation mode because power running is performed in this period, while the speed of rotation of the lifting motor becomes higher than its synchronous speed by a value corresponding to a slip in a lowering operation mode because regenerative running is performed in this period. Accordingly, a considerably large difference occurs in the speed of rotation between the lifting and lowering operation modes in spite of the same speed setting, and the difference becomes larger particularly during low speed operation.

In a conventional variable speed electric hoist such as described above, there has been a disadvantage in that a hung load often falls down when the output frequency is made extremely low, or a large speed difference sometimes occurs between the lifting and lowering operation modes in low speed running. As a counter measure to this disadvantage, Japanese Patent Unexamined Publication No. 61-101397 discloses a variable speed electric hoist which is capable of preventing a hung load from falling down during low speed operation and which produces a small speed difference between lifting and lowering operation modes.

However, this variable speed electric hoist has a problem in that the hoist is arranged so that a brake is turned off during a first condition on the basis of a signal produced by an invertor while the invertor is generating a three-phase AC current, and there is therefore a possibility that a hung load may fall down if a signal for turning-off the brake is produced from the invertor in spite of the second condition that the three-phase AC current is not generated by the invertor in case of a failure of the invertor.

SUMMARY OF THE INVENTION

It is therefore an object of the present invention to eliminate the problems with the prior art as described above.

Accordingly, the present invention provides a variable speed electric hoist capable of preventing a hung load from falling down even if a signal for turning-off a brake is produced from an invertor in spite of the condition that a three-phase AC current is not generated by the invertor in case of a failure of the invertor.

The variable speed electric hoist according to an aspect of the present invention comprises an emergency brake turn-on means for turning-on the brake when it is detected that the signal produced from the invertor for turning-on the brake is not stopped after the lifting/lowering signal is stopped.

In the variable speed electric hoist according to another aspect of the present invention, the emergency brake turn-on means is constituted by a rotation-quantity detection means for detecting the rotation quantity of the lowering operation of the lifting motor and a comparator means for detecting that the rotation speed of the lowering operation exceeds a predetermined limit after a lowering signal is stopped to thereby produce a signal for turning-on the brake upon detection of the excess rotation quantity.

According to the present invention, in the case where a brake turn-off signal produced from the invertor is not stopped after a lifting/lowering signal has been stopped, this third condition is detected and the brake is turned on so that a hung load can be surely prevented from falling down. The emergency brake turn-on means operates, even if a signal for turning-off the brake is produced from the invertor when a three-phase AC current is not generated from the invertor during a failure of the invertor, that is, when no torque is generated in the lifting motor.

Further, according to another aspect of the present invention, in the case where the rotation quantity of the lowering operation during the period after the lowering signal is stopped till the brake turning-off signal produced from the invertor is stopped exceeds a predetermined limit, the brake is turned on. Accordingly, the distance a hung load falls in the failure of the invertor can be suppressed to a value not more than a predetermined distance.

DETAILED DESCRIPTION OF PREFERRED EMBODIMENT

Figure 1:
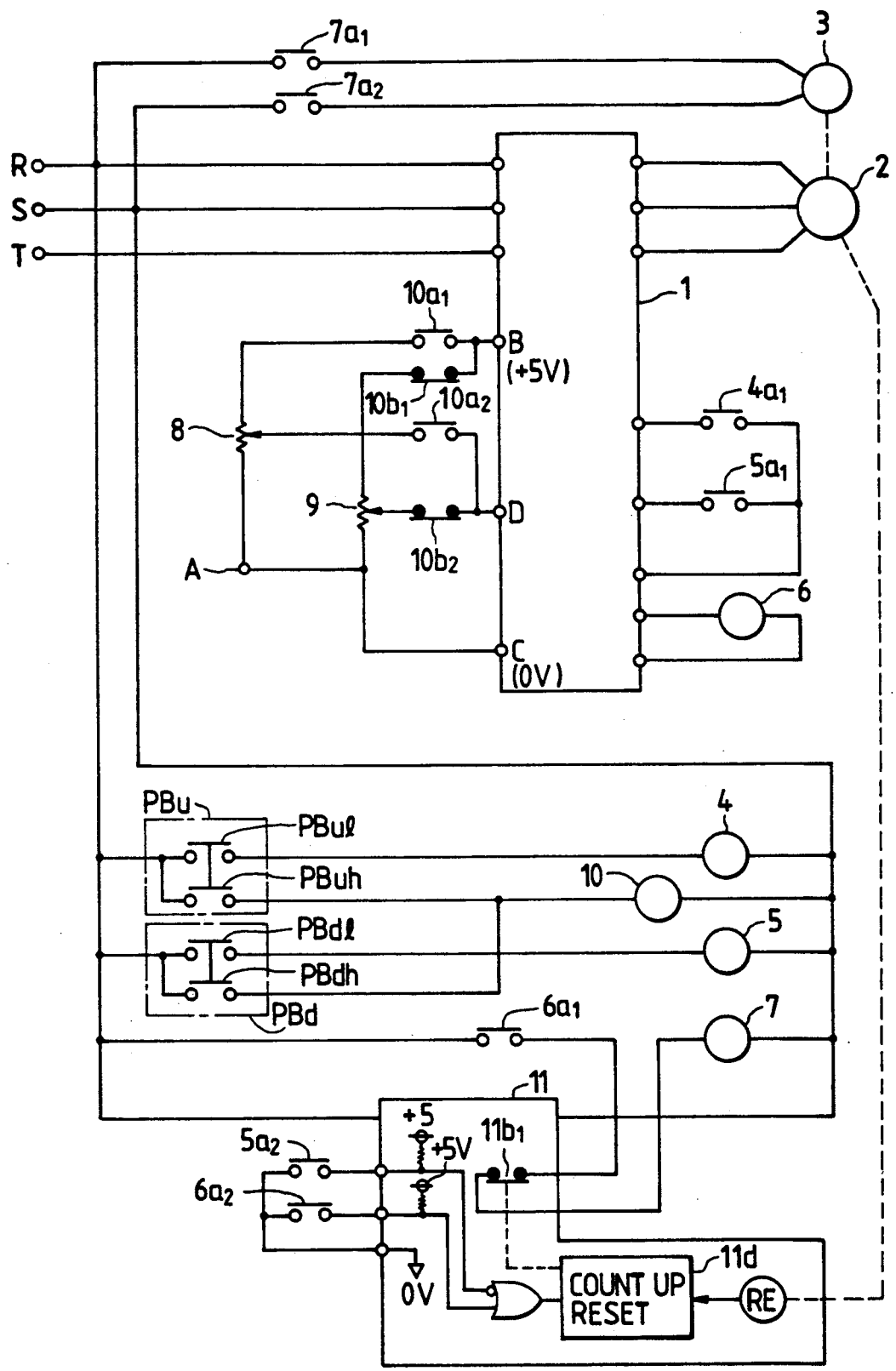
FIG. 1 is a circuit diagram showing an embodiment of the variable speed electric hoist according to the present invention.

Referring to the drawings, an embodiment of the variable speed electric hoist according to the present invention will be described hereunder.

In FIG. 1, a three-phase AC power source is supplied to an invertor unit 1 through feeder lines R, S and T. A lifting motor 2 is arranged to rotate at a speed and in the direction of rotation in accordance with the phase sequence and frequency of the three-phase AC current generated by the invertor unit 1. A brake 3 is arranged to lock the lifting motor 2 when the brake 3 is deenergized so that the lifting motor 2 does not rotate. While the brake 3 is energized, it releases the lifting motor 2 so that the lifting motor 2 can rotate freely. When a normally-opened two-stage push-button switch PBu for lifting operation is pushed to a first stage, a contact PBu1 is closed, and when the switch Pbu is further pushed to a second stage, also a contact Pbuh is closed. When a normally-opened two-stage push-button switch PBd for lowering operation is pushed to a first stage, a contact PBd1 is closed, and when the switch Pbd is further pushed to a second stage, also a contact PBdh is closed. An electromagnetic relay 4 is arranged to close its normally-opened contact $4a_1$ for instructing the invertor unit 1 to generate a three-phase AC current in a first phase sequence so that the lifting motor 2 rotates in the direction of lifting operation. An electromagnetic relay coil 5 is arranged to close a normally-opened contact $5a$ for instructing the invertor unit 1 to produce a three-phase AC current in a second phase sequence so that the lifting motor 2 rotates in the direction of lowering operation, and further operates to close a normally-opened contact $5a_2$. An electromagnetic relay coil 6 is arranged to be energized while the invertor 1 is generating a three-phase AC current, the electromagnetic relay coil 6 being arranged to close normally-opened contacts $6a_1$ and $6a_2$. An electromagnetic relay coil 7 is arranged to close normally-opened contacts $7a_1$ and $7a_2$ for electrically energizing the brake 3 with power from the R and S feeder lines of the three-phase AC power source. A low-speed setter 8 and a high-speed setter 9 are constituted by variable resistors respectively. When the push-button switch Pbu or PBd is pushed to its second stage, the electromagnetic relay coil 10 is energized to close normally-opened contacts $10a_1$ and $10a_2$ and open normally-closed contacts $10b_1$ and $10b_2$ so as to change over the speed setter from the low-speed setter 8 to the high-speed setter 9. An emergency brake turn-on means 11 is arranged to open a normally-closed contact $11b$ when the normally-opened contact $6a_2$ has not opened after the normally-opened contact $5a_2$ has been opened. In other words, if contact $5a_2$ is open and $6a_2$ is closed, emergency brake turn-on means 11 contact $11b_1$ is opened.

Figure 2:
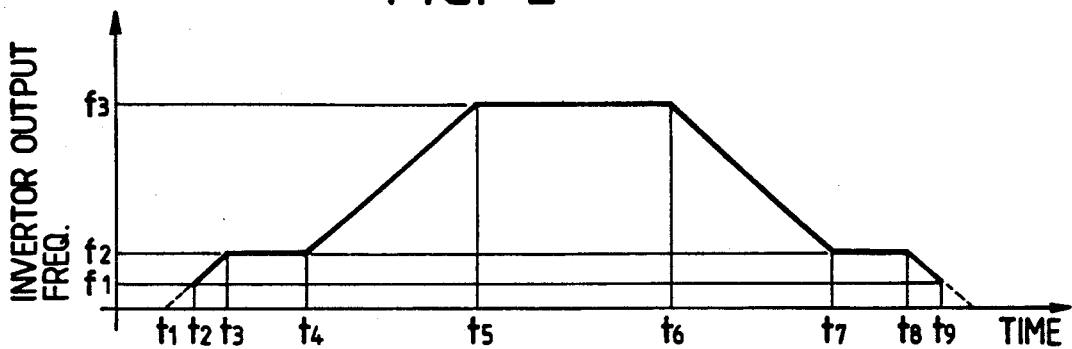
FIG. 2 is an illustrative view of an operational characteristic of the three-phase AC current generated by the invertor and applied to the lifting motor of the hoist of FIG. 1.

Referring to FIGS. 1 and 2, the operation of the embodiment of the invention will be described.

If the push-button switch PBu is pushed to the first stage at a point of time $t_1$, the normally-opened contact $4a_1$ is closed so that the invertor unit 1 starts to increase the frequency of the three-phase AC current from 0 Hz toward $f_2$ Hz, which is set by the low-speed setter 8 along a predetermined ramp. When the frequency reaches $f_1$ at the point of time $t_2$, the invertor unit 1 starts to supply the generated three-phase AC current to the lifting motor 2 and simultaneously energizes the electromagnetic relay coil 6 so as to close its normally-opened contact $6a_1$. Since the normally-closed contact $11b_1$ is in the closed state at this time, the electromagnetic relay coil 7 is energized so as to close its normally-opened contacts $7a_1$ and $7a_2$ so that the brake 3 is energized to release the lifting motor 2 to start to rotate in the direction of lifting operation. Then, lifting motor 2 is gradually accelerated. When the frequency reaches $f_2$ at the point of time $t_3$, the invertor unit 1 stops increasing the frequency so that the lifting motor 2 is driven to rotate at a constant low speed. If the push-button switch PBu for lowering operation is further pushed to the second stage at the point of time $t_4$, the electromagnetic relay coil 10 is energized so that the low-speed setter 8 is separated and the high-speed setter 9 is connected to invertor unit 1. Then, the invertor unit starts to increase the frequency again to $f_3$ set by the high-speed setter 9 along a predetermined ramp so that the lifting motor 2 increases its speed again. When the frequency reaches $f_3$ at the point of time $t_5$, the invertor unit 1 stops increasing the frequency so that the lifting motor 2 is driven to rotate at a constant high speed. If the push-button PBu is returned, at the point of time $t_6$, from the second stage to the first stage to thereby change over the speed setting from the high-speed setter 9 to the low-speed setter 8, the invertor unit starts to decrease the frequency along a predetermined ramp. When the frequency reaches $f_2$ at the point of time $t_7$, the invertor unit 1 stops decreasing the frequency so that the lifting motor 2 is driven to rotate at the constant low speed. If the push-button PBu is released, the electromagnetic relay coil 4 is deenergized so that its normally-opened contact $4a_1$ is opened, and the invertor unit 1 starts to decrease the frequency to 0 Hz along a predetermined ramp. When the frequency reaches $f_1$ at the point of time $t_9$, the invertor unit 1 stops feeding its output to the lifting motor 2 and simultaneously deenergizes the electromagnetic relay coil 6 so as to open its normally-opened contact $6a_1$, so that the coil 7 is deenergized to open its normally-opened contacts $7a_1$ and $7a_2$, the brake 3 is deenergized, and the lifting motor 2 is locked to stop rotating.

Upon depression of the push-button switch PBd, the electromagnetic relay coil 5 is energized so that the lifting motor 2 rotates in the direction of lowering operation. The other operation is the same as that in the above case of depression of the push-button switch PBu.

The operation of the emergency brake turn-on means 11 will now be described. Upon depression of the normally-opened two-stage push-button switch PBd for lifting operation, the normally-opened contact $5a_1$ is closed so that a lowering signal is applied to the invertor unit 1 and simultaneously the normally-opened contact $5a_2$ is closed. The invertor unit 1 energizes coil 6 at the time when the invertor unit 1 starts to supply its output to the lifting motor 2 to make the latter rotate in the direction of lowing operation, so as to close the normally-opened contact $6a_1$ to turn off the brake 3, and simultaneously the normally-opened contact $6a_2$ is closed. Next, when the hand is detached from the push-button switch PBd, the normally-opened contact $5a_1$ is opened to make the lowering signal applied to the invertor unit disappear, and simultaneously the normally-opened contact $5a_2$ is opened. Then, the invertor unit 1 deenergizes the coil 6 at the time when the invertor unit 1 stops producing its three-phase AC current, so that the normally-opened contact $6a_1$ is opened to make the brake 3 brake the lifting motor 2. In the case where the coil 6 is not deenergized due to a failure, in spite of the fact that the invertor unit 1 has stopped generating its three-phase AC current, both the normally-opened contacts $6a_1$ and $6a_2$ are kept closed, the brake 3 remains turned off, and the lifting motor 2 loses its torque, so that a load falls down. Here, the emergency brake turn-on means 11 detects the rotation quantity of the lifting operation during the period from the time when the push-button switch PBd is released, so as to open the normally-opened contact $5a_2$, until the time when the coil 6 is deenergized, so that the normally-opened contact $6a_2$ is opened and the brake 3 starts to lock the lifting motor 2. If the coil 6 is not deenergized by a failure, thereby allowing the load to fall down, a rotary encoder RE detects the fact that the rotation quantity of the lowering operation before the opening of the normally-opened contact $6a_2$ exceeds the quantity previously set so as to be a little more than the rotation quantity of the lowering operation required for deceleration in normal time, and a counter $11d$ counts up so as to open the normally-closed contact $11b_1$. Then, the coil 7 is deenergized, and the brake 3 locks the lifting motor 2 so that the load can be prevented from falling down.

Figure 3:
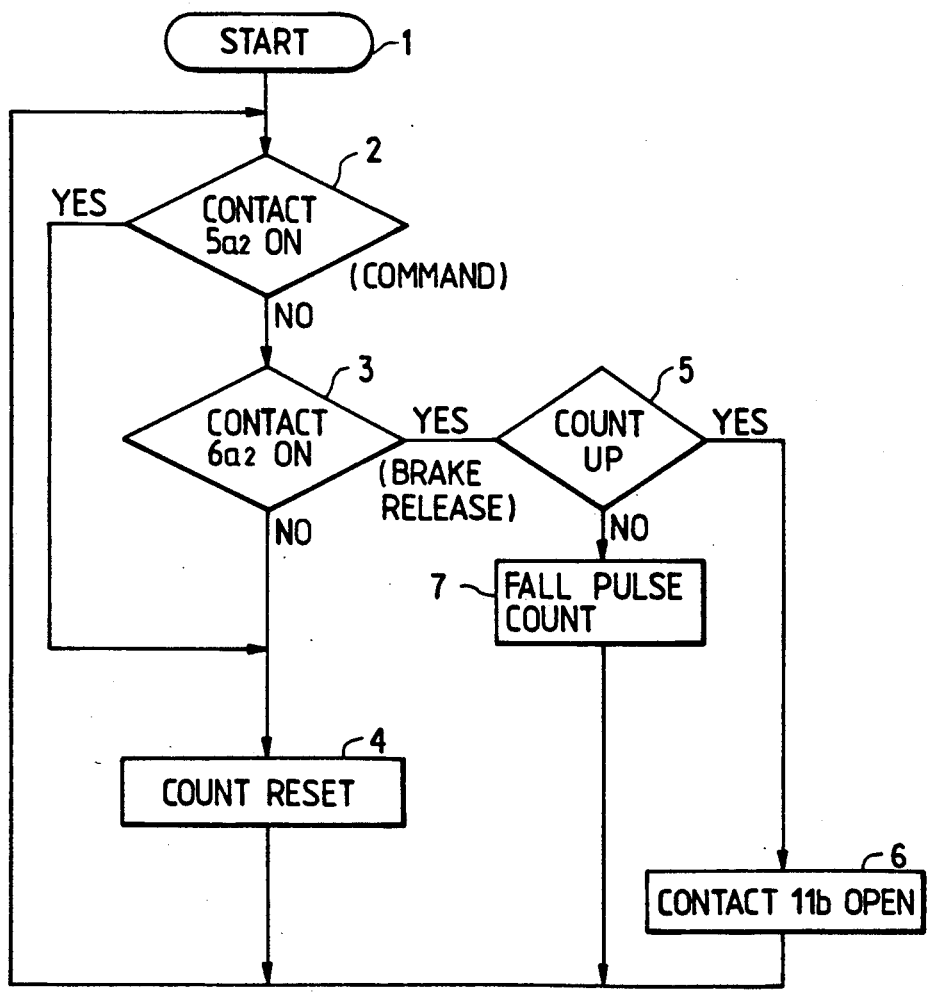
FIG. 3 is a flowchart showing the operation of the hoist of FIG. 1.

That is, as shown in the flowchart of FIG. 3, the operation of emergency brake turn-on means 11 is initiated at step 1. If it determined that the normal-opened contact $5a_2$ is ON in a step 2, the counter $11d$ is reset in a step 4. Further, even if the normally-opened contact $5a_2$ is OFF and the normally-opened contact $6a_2$ is also OFF, the counter $11d$ is similarly reset in the step 4. If it is proved that the normally-opened contact $6a_2$ is ON in a step 3, it is judged whether the counter $11d$ has counted up to a predetermined limit or not in a step 5. Here, if it is determined that the counter $11d$ has counted up to a predetermined limit, the normally-closed contact $11b1$ is opened in a step 6. If it is proved that the counter $11d$ has not counted up to the predetermined limit yet, on the contrary, the counter $11d$ continues to count fall pulses from rotary encoder RE in step 7. Then steps 2 through 7 are repeated.

Thus, the load is prevented from falling down.

Although the push button of the two-stage pushing type is used so as to realize a two-stage variable speed in the embodiment described above, the push button of the one-stage pushing type may be used so as to make the hoist be of the one-stage variable speed type.

As described above, according to the present invention, the variable speed electric hoist is provided with an emergency brake turn-on means for detecting that a brake turn-off command produced by the invertor is not stopped and for turning on the brake, so that the load can be prevented from falling down. Further, according to another aspect of the invention, rotation quantity of the lowering operation in the period from the stoppage of the lowering command to the application of brake is detected, so that, in the case where rotation quantity of the lowering operation is larger than a predetermined limit, the brake is forcibly applied so as to surely stop the lowering in the minimum distance possible.

What is claimed is:

1. A variable speed electric hoist, comprising:
   lifting motor means for lifting a load in an upward or downward direction, said lifting motor means rotably moving so as to provide said lifting;
   brake means operatively connected to said lifting motor means for selectively locking said lifting motor means;
   invertor means operatively coupled to said lifting motor means for generating an output current so as to energize said lifting motor means and for generating a signal to turn off said brake means;
   speed setting means operatively coupled to said invertor means for setting the speed of rotation of said lifting motor means responsive to an output of said speed setting means;
   brake on/off operation means for turning off said brake means in response to a first condition in which said invertor means is generating said output current, and for turning on said brake means in response to a second condition in which said invertor means is not generating said output current; and
   emergency brake turn-on means for directly turning on said brake means, even when said brake means has been turned off under said second condition and said invertor is not generating said output current.

2. A variable speed electric hoist according to claim 1, wherein said emergency brake turn-on means comprises a detection means for detecting a downward rotation quantity of said lifting means, and a comparison means for determining whether said downward rotation quantity of said lifting motor means exceeds a predetermined limit after said invertor means stops generating said output current, and for generating an emergency output signal to turn on said brake means in response to detecting that said downward rotation quantity of said lifting motor means exceeds said predetermined limit.

3. A variable speed electric hoist accord 1, wherein said output of said invertor means is a three-phase AC current.

4. A variable speed electric hoist according to claim 2, wherein said detection means is a rotary encoder and said comparison means is a counter.

5. A variable speed electric hoist according to claim 1, wherein said speed setting means comprises low-speed and high-speed setters each being constituted by a variable resistor.

6. A variable speed electric hoist according to claim 1, wherein said emergency brake turn on means is responsive to the rotation speed of said lifting motor means.

* * * * *